March 13, 1956  H. R. EDER  2,737,768
POWER LAWN EDGER HAVING ROTARY BLADE

Filed Jan. 14, 1953  2 Sheets-Sheet 1

Harold R. Eder
INVENTOR

BY *C. A. Snow & Co.*
ATTORNEYS.

March 13, 1956     H. R. EDER     2,737,768
POWER LAWN EDGER HAVING ROTARY BLADE
Filed Jan. 14, 1953        2 Sheets-Sheet 2

Harold R. Eder
INVENTOR

BY *Cl Snow &Co.*
ATTORNEYS.

United States Patent Office 2,737,768
Patented Mar. 13, 1956

2,737,768
POWER LAWN EDGER HAVING ROTARY BLADE

Harold R. Eder, Clearwater, Fla.

Application January 14, 1953, Serial No. 331,250

1 Claim. (Cl. 56—25.4)

This invention relates to a lawn edging device, the primary object of the invention being to provide a device of this character embodying a lower supporting frame having means whereby the conventional electric hand drill, sander or polisher may be converted for use in supplying the propelling medium for the device.

Another object of the invention is to provide a device of this character wherein the weight of the edger will be reduced to a minimum, and the portability of the edger increased substantially.

Still another object of the invention is to provide a serrated bar with which a rotary cutting blade cooperates in accomplishing the edging operation, insuring a straight and even edge at all times.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
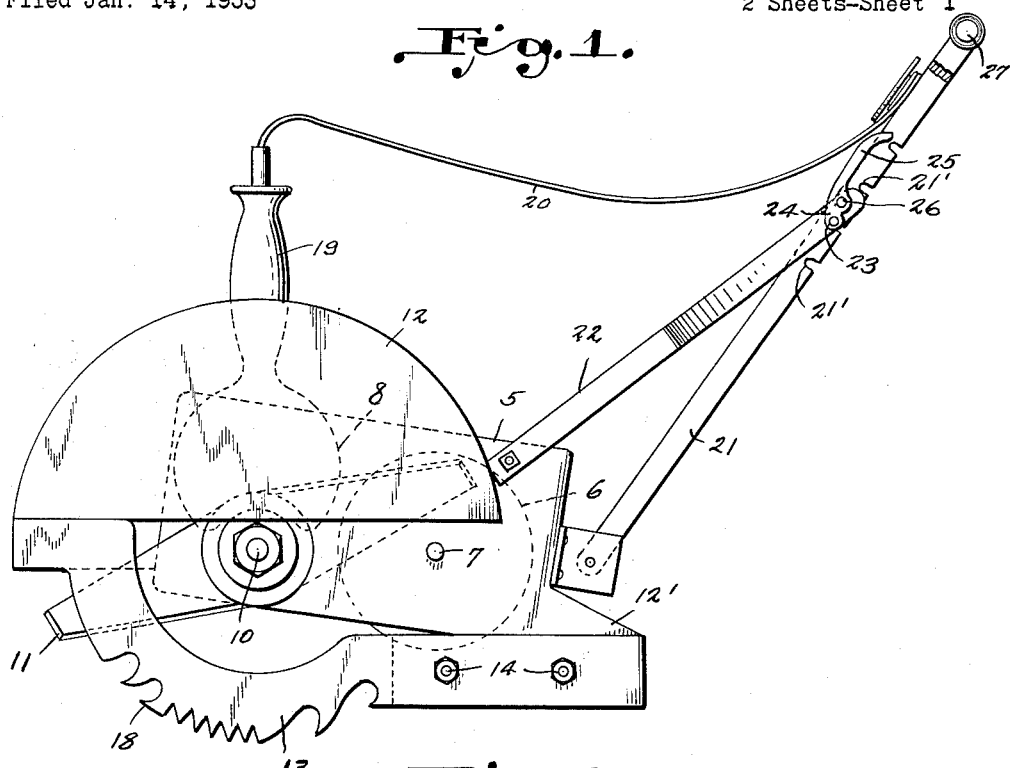
Figure 1 is a side elevational view of a power lawn edging device constructed in accordance with the invention.
Figure 2:
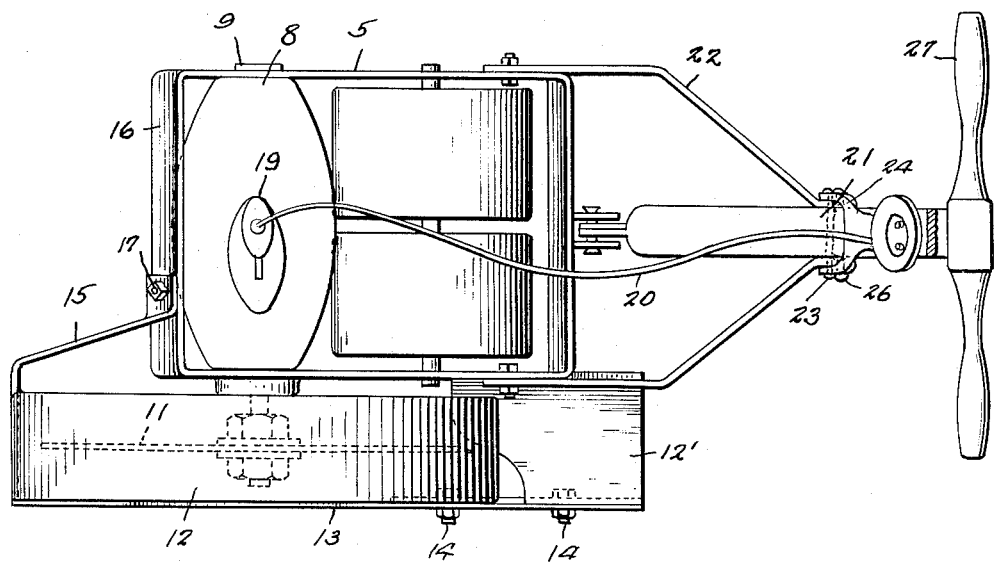
Fig. 2 is a plan view thereof.
Figures 3, 4:
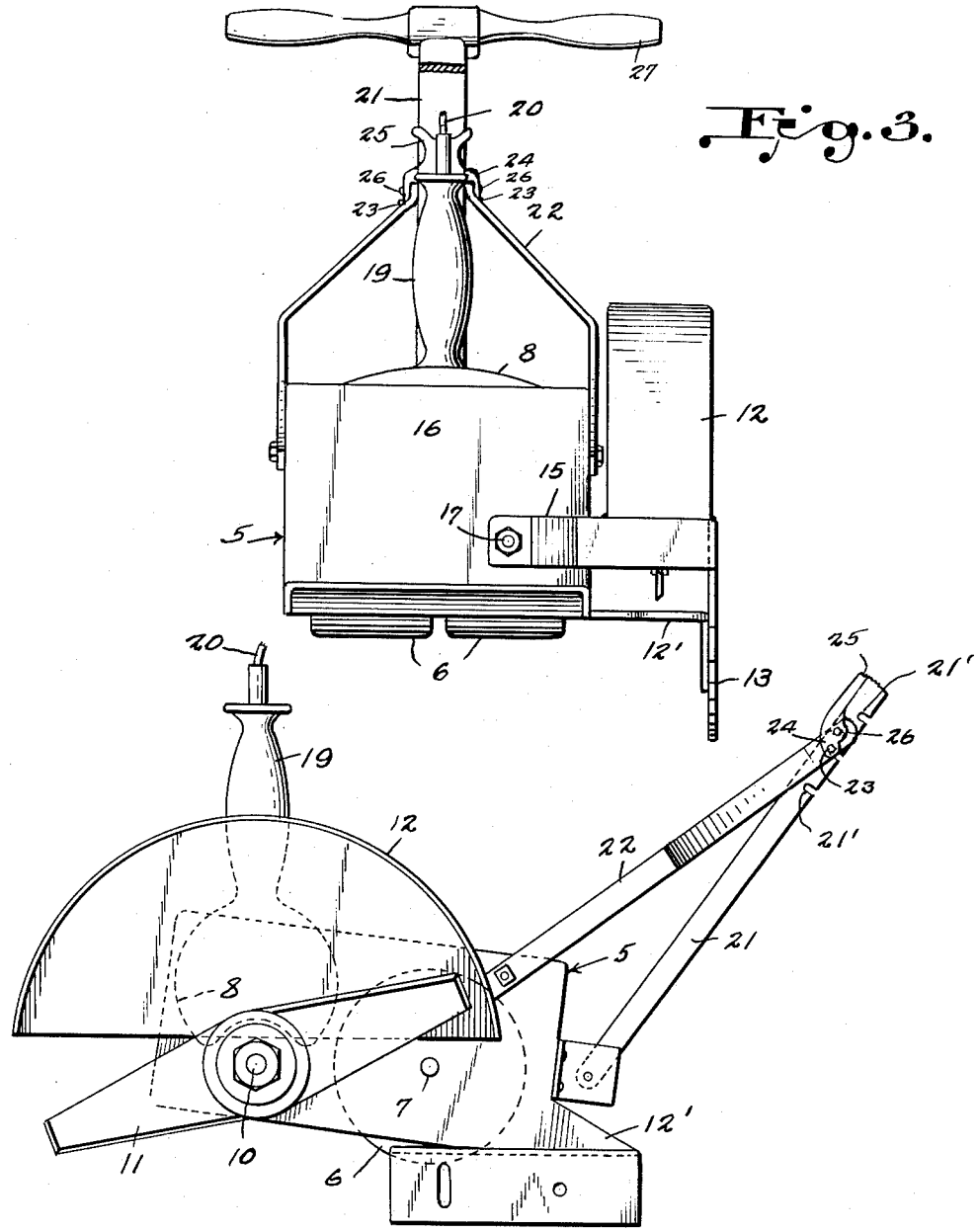
Fig. 3 is a front elevational view of the device.
Fig. 4 is a side elevational view thereof, parts thereof having been removed.

Referring to the drawing in detail, the device comprises the rectangular frame 5 which is supported on the rollers 6 mounted on the axle 7 that has its ends disposed in bearing openings in the side members of the rectangular frame 5.

The reference character 8 indicates a conventional electric hand drill, sander or polishing device, which is held between the side members of the frame, by means of the extension 9 of the electric hand drill, sander or polisher, which is fitted in an opening of one of the side bars of the frame with the shaft 10 of the electrical device extending through an opening in the other side bar of the frame, where it provides a support for the rotary cutting blade 11, which operates under the guard 12 to protect the operator against injury due to contact with such rotary blade.

The side plate at one side of the frame is formed with the extension 12' that extends laterally therefrom at the rear end thereof, the extension 12' providing the support for the curved serrated arm 13, which is secured to the extension by means of bolts 14. The opposite end of the curved serrated blade 13 is extended laterally at 15, from where it is bolted to the front bar 16 of the frame, by the bolt 17. This serrated blade 13 is so disposed with respect to the rotating blade 11 that grass picked up by the teeth 18 of the serrated blade will be held in such position that the rapidly rotating cutting blade will clip the grass to trim the edge of the lawn.

The handle of the electrical hand drill or device is indicated by the reference character 19 and extends vertically within the frame, the handle being provided with the usual bore through which the electrical wires 20 extend to the motor of the electric device, the wires 20 being connected with the usual house current for supplying the current to operate the motor.

The handle 21 is provided with notches 21' extending inwardly from the lower edge thereof, which notches receive the pin 23 or latch 24 which is carried by the lever 25 of the latch, the lever 25 being pivotally connected to the brace bars 22 at 26, so that an operator holding the hand grip 27 may have ready access thereto to adjust the angle of operation of the handle for the convenience of the operator in cutting in close places.

From the foregoing it will be seen that due to the construction shown and described, I have provided a frame which will receive the usual electric hand drill, sander or polisher and support the same in such a way that a cutting blade secured to the shaft thereof will operate to cut grass along the edge of a walk or drive, the machine being exceptionally light and maneuverable for light work.

Having thus described the invention, what is claimed is:

A lawn edger comprising a rectangular frame including spaced side bars, supporting rollers mounted between said side bars, a portable motor having a power shaft, removably supported between said side bars of said frame, one end of said power shaft extending a substantial distance beyond one side bar, on which a rotary cutting blade is secured, a vertically curved guard providing a housing, secured to said frame and located above said cutting blade, the guard housing the major portion of said blade, a substantially narrow extension forming a part of one of said side bars, said extension extending rearwardly and forwardly in spaced relation with said side bar of which it forms a part, a curved serrated blade having one of its ends connected to said extension, the other end of said serrated blade extending laterally and connected with said rectangular frame, securing said serrated blade in position on said frame, and said serrated blade adapted to hold vegetation to be cut upright, during the cutting operation.

References Cited in the file of this patent

UNITED STATES PATENTS

| | | |
|---|---|---|
| D. 163,486 | Sanford | May 29, 1951 |
| 2,410,196 | Benthall, Sr. | Oct. 26, 1946 |
| 2,458,200 | Renfroe et al. | Jan. 4, 1949 |
| 2,540,616 | Hasslacher | Feb. 6, 1951 |
| 2,549,317 | Laughlin | Apr. 17, 1951 |
| 2,630,665 | Lauer | Mar. 10, 1953 |
| 2,630,669 | Hurd | Mar. 10, 1953 |
| 2,653,381 | Rooke | Sept. 28, 1953 |